United States Patent [19]

John et al.

[11] 4,341,952

[45] Jul. 27, 1982

[54] VARIABLE PITCH GROOVED LABEL FOR VIDEO DISC

[75] Inventors: Gunter John, Indianapolis, Ind.; Philip M. Heyman, Trenton; David P. Bortfeld, Kendall Park, both of N.J.

[73] Assignee: RCA Corporation, New York, N.Y.

[21] Appl. No.: 142,855

[22] Filed: Apr. 21, 1980

[51] Int. Cl.³ .................. G06K 19/06; G11B 7/24; G11B 23/40

[52] U.S. Cl. .................. 235/487; 369/273; 369/274; 369/275; 369/277; 369/291

[58] Field of Search .................. 369/32-33, 369/30, 41, 54, 58, 109, 273, 274, 275, 277, 283, 284, 77; 235/454, 462, 464, 470, 494, 487, 490; 365/234

[56] References Cited

U.S. PATENT DOCUMENTS

| Re. 22,183 | 9/1942 | Thompson | 369/132 |
|---|---|---|---|
| 1,877,079 | 9/1932 | Sturgis | 369/273 |
| 2,038,563 | 4/1936 | Herrmann . | |
| 2,952,464 | 9/1960 | Stimler | 369/41 |
| 3,708,655 | 1/1973 | Schanne . | |
| 3,731,060 | 5/1973 | Weinstein . | |
| 3,991,883 | 11/1976 | Hobler et al. . | |
| 4,010,355 | 3/1977 | Roehrman et al. . | |
| 4,011,435 | 3/1977 | Phelps et al. | 235/470 |
| 4,066,268 | 1/1978 | Borchard . | |
| 4,108,365 | 8/1978 | Hughes | 369/30 |
| 4,109,919 | 8/1978 | Elliott et al. | 369/77 |
| 4,166,621 | 9/1979 | Isaacson et al. . | |
| 4,180,830 | 12/1979 | Roach | 369/54 |

FOREIGN PATENT DOCUMENTS

| 325199 | 2/1930 | United Kingdom . |
| 1390404 | 4/1975 | United Kingdom . |
| 1398689 | 6/1975 | United Kingdom . |
| 1485265 | 9/1977 | United Kingdom . |

Primary Examiner—Raymond F. Cardillo, Jr.
Attorney, Agent, or Firm—E. M. Whitacre; J. S. Tripoli; R. G. Coalter

[57] ABSTRACT

A video disc record suitable for use with a video disc player apparatus is provided with a label for identifying the program material stored on the surface of the record. The label is formed in a machine readable format which comprises grooves in the surface of the record. In one format whorls of a spiral groove of a first pitch are spaced alternately with whorls of a spiral groove of a second pitch. A readout apparatus comprises a light beam which is arranged to scan the grooved label and a detector which is arranged to sense the light beam reflected from the disc record surface. Light striking a grooved section of first pitch is reflected in a substantially specular direction while light striking a grooved section of second pitch is substantially scattered out of the specular direction. The detector is arranged to collect the light reflected into the specular direction.

6 Claims, 5 Drawing Figures

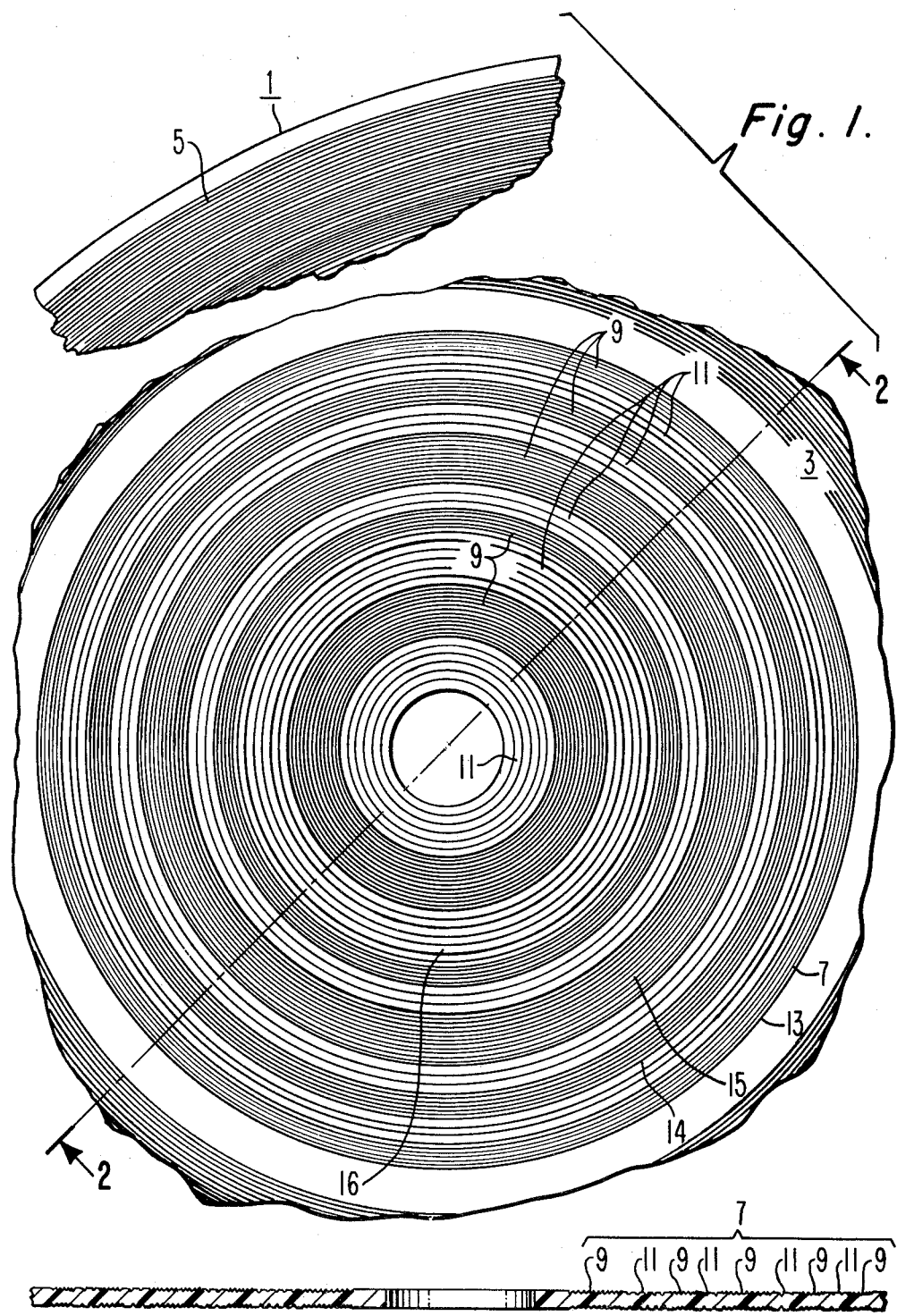

VARIABLE PITCH GROOVED LABEL FOR VIDEO DISC

The present invention relates generally to marking systems, and, more particularly, to marking systems for identifying program material on disc records.

In certain video disc systems, information is stored on a disc record in the form of geometric variations in a continuous spiral groove disposed on the record surface. Variations in capacitance between an electrode incorporated in a groove-riding stylus and a conductive property of the record are sensed to reproduce the stored information. A capacitance-type video disc system is illustratively disclosed in U.S. Pat. No. 3,842,194 (Clemens).

In such systems as well as non-capacitive disc systems, it is often beneficial to enclose the disc record in a protective caddy to provide a dust-free environment for the disc and to deter indiscriminate access to the record. For an illustration of a protective caddy and a video disc record combination and a disc player for use with the caddy/record combination, reference may be made to U.S. Patent Application Ser. No. 098,417 filed Nov. 28, 1979 for Coleman et al now U.S. Pat. No. 4,239,108.

In a concurrently filed U.S. Patent Application Ser. No. 142,852, filed Apr. 21, 1980; for W. R. Roach entitled VIDEO DISC HAVING A LABEL FOR IDENTIFYING MATERIAL RECORDED THEREON, a record identification scheme is disclosed. In the Roach format an annular region near the center of the disc record is embossed with a grooved label. In one embodiment the label comprises a plurality of whorls of groove convolutions spaced with regions of non-grooved sections. The non-grooved regions of the label surface reflect light in a specular direction while the grooved regions scatter the light substantially away from the specular direction permitting detection of the grooved/ungrooved pattern. The arrangement and width of the elements of the pattern which is representative of a code may be read by an optical decoder to identify the program material contained in a spiral track recorded on the surface of the disc record.

The label is formed by machining sets of fine grooves (e.g., 110° included angle, 0.0001 inch deep) into a metal substrate. When the label comprises grooved regions alternating with ungrooved regions as described in the Roach application, the stylus which is used to cut the metal substrate must be raised and lowered in accordance with the pattern to be embossed on the disc record surface. Every time the stylus is lowered there is a possibility that the stylus may be broken upon contact.

Further, it is felt that the set-up time required to raise and lower the stylus on the machining lathe may be unduly time consuming.

The present invention is directed toward the generation of a disc label or code of the Roach type wherein the cutting stylus is not raised and lowered during the mastering process.

In accordance with the principles of the present invention, a grooved label for video disc records is provided wherein the possibilty of breaking the cutting stylus and cutting the groove out of tolerance is substantially reduced.

Further, in accordance with the principles of the present invention the set-up time for raising and lowering the stylus is reduced.

Other features and advantages of the invention will be more fully understood from the following detailed description of the preferred embodiment, the appended claims, and the accompanying drawing in which:

FIG. 1 illustrates a plan view of a video disc record having a grooved label in accordance with the principles of the present invention;

FIG. 2 illustrates a cross-sectional view of section 2—2 of FIG. 1;

Figure 3:
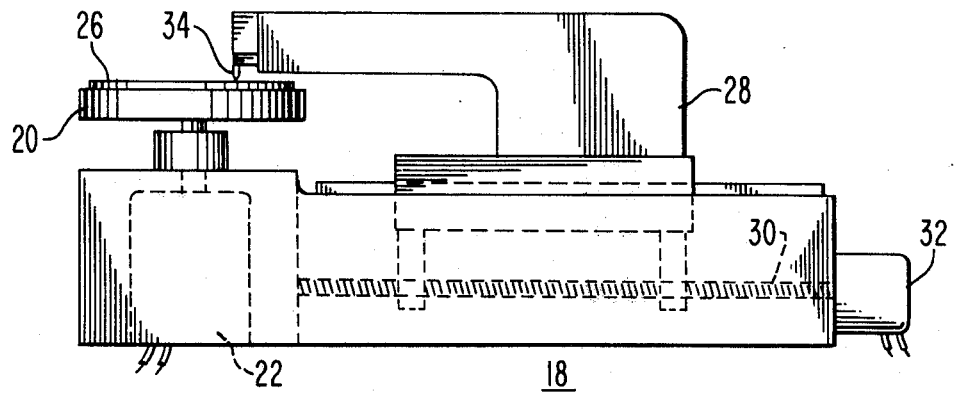
FIG. 3 represents a side view of a mechanical lathe apparatus which is suitable for cutting a grooved label into a surface of a metal master.

FIG. 1 illustrates a plan view of a video disc record 1 having a grooved label in accordance with one aspect of the present invention. The video disc record 1 which is formed of a conductive-plastic material, such as carbon in a polyvinyl chloride base, has an annular area 3 including a spiral information track 5. In one format for a video disc, information stored in the form of undulations along the length of spiral track 5 is recovered by detecting variations in the capacitance formed by the disc and stylus electrode for playback on a color television receiver. A second annular area 7 on the surface of disc record 1 comprises first surface regions 9 which alternate with second surface regions 11. FIG. 2 illustrates a cross-sectional view of section 2—2 of FIG. 1. Surface regions 9 are provided with a surface effect, such as a V-shaped spiral groove of 110° included angle and a pitch of approximately 8,000 grooves per inch, while surface regions 11 are provided with another surface effect, such as a spiral groove having a pitch of approximately 1,000 grooves per inch.

Figure 4:
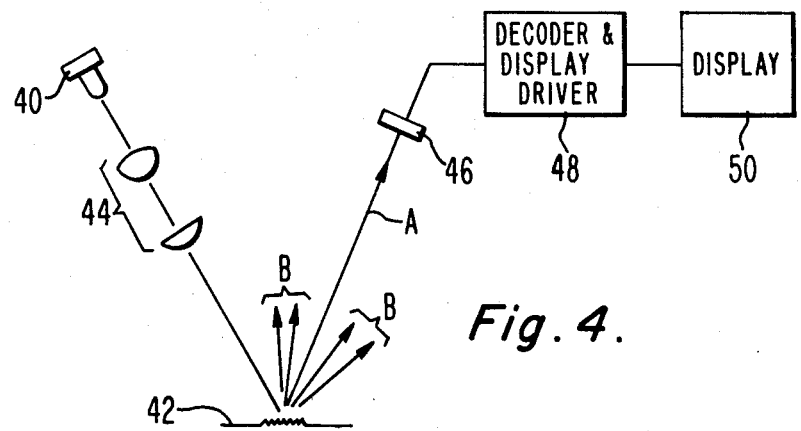
FIG. 4 shows apparatus for optically reading the identifying indices of a video disc record of a type illustrated in FIG. 1.

The arrangement and width of surface regions 9 and 11 may be representative of a code used to identify the program material contained in spiral track 5. The coded representation may be read out by scanning annular area 7 with a light beam or by imaging it onto a fixed detector as illustrated in FIG. 4 and in application entitled "Apparatus for Reading An Identifying Label On An Information Record" filed concurrently herewith. Grooved surface region 9 consists of densely packed grooves such that light incident on this region is scattered efficiently into large angles significantly removed from the specular direction. In grooved surface region 11 the groove density is low, leaving a large portion of the intergroove spacing motorlike, such that most of the light is specularly reflected or diffracted into a cone near the specular angle.

In one embodiment, the coded pattern of annular area 7 may comprise a two-out-of-five interleaved barcode which corresponds to a digital representation of the identity of the program material on disc record 1. In a two-out-of-five interleaved code, sense markings 13 and 14 of a first width (e.g., narrow band) correspond to a first binary digit such as an "0" and sense markings 15 and 16 of a second width (e.g., wide band) correspond to another binary digit such as a "1".

The label which is coded by the varying widths and arrangement of surface regions 9 and 11 in annular area 7 may be formed by machining sets of fine grooves into a metal substrate during record manufacturing. A stamper disc may be derived from the metal substrate, as by techniques described in the Clemens' patent, and utilized, through record stamping machinery, to produce a plurality of replica discs, each replica disc having the same fine groove pattern which appears in the metal substrate.

In FIG. 3 a side view of a mechanical lathe apparatus 18 for cutting a grooved label into the surface of a master disc is illustrated. A turntable 20 is rotated at a substantially constant velocity of, for example, 450 rpm by a motor 22. A copper coated aluminum substrate 26 shaped in the form of a disc is mounted on turntable. A movable support member 28 is coupled to a lead screw 30 which is driven by motor 32. The movable support member 28 has affixed thereto cutting stylus 34. When lathe 18 is used to cut a grooved label, cutting stylus 34 is adjusted to impinge upon disc 26 and is operated to radially traverse disc 26 while turntable 20 is rotated. The relative motion established between stylus 34 and disc 26 effects a spiral groove pattern. The linear speed of support 28 is varied when the cutting stylus is operating in the area of the substrate corresponding to area 7 of the replica disc record 1 such that whorls of a spiral groove of a first pitch (e.g., 8,000 grooves per inch) are spaced alternately with whorls of a spiral groove of a second pitch (e.g., 1,000 grooves per inch), thus creating the patterns which form identifying indices or label of the video disc record.

FIG. 4 illustrates an apparatus for reading the regions 9 and 11. A set of condenser optics 44 is interposed between a projection lamp 40 and video disc record surface 42 such that the light from lamp 40 impinges on the coded portion of disc record surface 42. The light beam which impinges on the disc surface is either substantially reflected in a specular direction A or primarily scattered in various diffracted directions B, substantially away from direction A, depending upon whether the impinging light beam is incident on a relatively low density or relatively high density grooved section of the coded disc surface respectively. In one arrangement detector 46 (e.g., Reticon camera having 1024 elements) is positioned to collect the specularly reflected light (i.e., light reflected from a low groove density region 11). When the light beam falls onto an area of the disc surface where the density of grooves is high (e.g., 8,000 grooves/inch in regions 9) the majority of the light is diffracted or scattered out of the specular direction and thus does not reach the detector or, at least, does not reach the detector with the intensity of specularly reflected light. The output of detector 46, which is in the form of a digital pulse train corresponding to the narrow and wide bands of the interleaved 2-of-5 code, is fed to decoder and display driver 48. The output of display driver 48 is then fed to a display 50 (e.g., a 10-digit LED) which provides a digital output representative of the coded pattern recorded on the disc record surface. Alternatively, the output from detector 46 may be fed to a commercial decoder (e.g., Identicon Series 600) which may be used in a caddy matching system.

Figure 5:
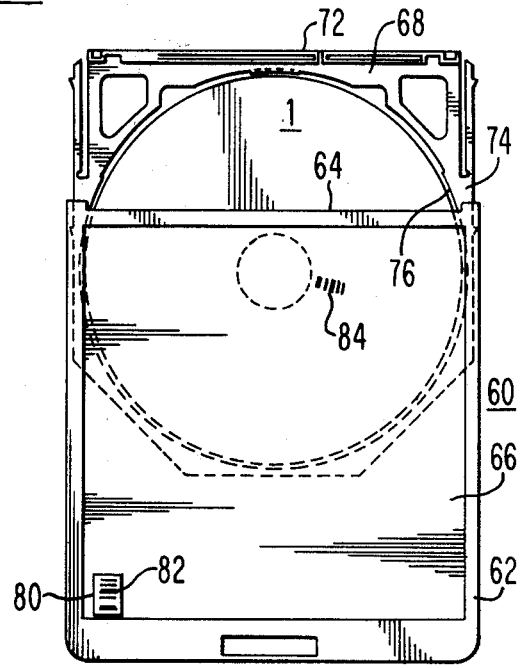
FIG. 5 illustrates a plan view of a video disc record/-protective caddy combination.

As shown in FIG. 5, video disc caddy 60 comprises a jacket 62 having an edge opening 64 communicating with a record enclosing cavity 66 and a record retaining spine 68. The record retaining spine has a portion 72 which serves as a closure when the spine is fully inserted into the jacket 62 and a portion 74 having a circular opening 76 for receiving record 1. Affixed to jacket 62 is a label 80 having a bar code 82 representative of a code used to identify the program material stored on record 1 enclosed therein. The coded pattern 84 incorporated on a record 1 within the center area of the disc corresponds to bar code 82 on label 80 of caddy 60.

The disc record 1 and caddy 60 may be mated during the record manufacturing process. The disc record 1 which has been prepared for customer playback may be identified by reading the product code peculiar to that particular disc with an apparatus of the type described with reference to FIG. 4. Simultaneously, the product code of the caddy 60 which has been labeled may be identified by scanning bar code 82 with a Identicon 628 commercial decoder. If the product code on record disc 1 matches the product code on caddy 60, an operator slides record disc 1 and record retaining spine 68 into jacket 62. The caddy/disc assembly is then shrink-wrapped prior to shipment to the customer.

Thus, the present invention is directed to a means for providing a machine readable code or label on a record wherein the code may be formed without changing mastering conditions other than the parameter which controls the density of the convolutions of the patterns which forms the code or label on the disc record.

What is claimed is:

1. A disc record for storing information signals of a given program, said disc record comprising:
   a first annular area on a surface of said disc having an information track therein comprising elements corresponding to the information signals of said given program stored on said disc record; and
   a second annular area on said surface of said disc having a continuous spiral groove formed therein, said second annular area comprising a first plurality of surface regions and a second plurality of surface regions;
   the portions of said continuous spiral groove formed in said first plurality of surface regions having a first spiral pitch, said spiral groove of said first pitch deflecting light incident thereon in a first direction;
   the portions of said continuous spiral groove formed in said second plurality of surface regions having a second spiral pitch, said spiral grooves of said second pitch deflecting light incident thereon substantially away from said first direction;
   the arrangement of said first surface regions with respect to the arrangement of said second surface regions being representative of the identity of the information signals of said given program stored in said first annular area.

2. The disc record according to claim 1 wherein said first surface regions have a spiral groove pitch of approximately 1,000 convolutions/inch and wherein said second surface regions have a spiral groove pitch of approximately 8,000 grooves/inch.

3. The disc record according to claim 2 wherein said spiral groove is a V-shaped spiral groove having an included angle of 110°.

4. In a video disc system for information recovery of video and sound signals, the combination comprising:
   a disc record for storing a given program which includes said video and sound signals, said disc record comprising:
   a first annular area on a surface of said disc having an information track therein comprising elements representative of said given program; and
   a second annular area on said surface of said disc having a continuous spiral groove formed therein, said second annular area comprising a first plurality of surface regions and a second plurality of surface regions;

the portions of said continuous spiral groove formed in said first plurality of surface regions having a first spiral pitch, said spiral groove of said first pitch deflecting light incident thereon in a first direction;

the portions of said continuous spiral groove formed in said second plurality of surface regions having a second spiral pitch, said spiral groove of said second pitch deflecting light incident thereon substantially away from said first direction;

the arrangement of said first surface regions with respect to the arrangement of said second surface regions forming a machine readable code representative of the identity of said given program stored in said first annular area; and a caddy for providing a protective enclosure for said disc record, said caddy comprising:

a jacket for receiving said disc record; and a label attached to said jacket for identifying said given program on the video disc record intended to be stored in said caddy.

5. The combination according to claim 4 wherein said first surface regions have a spiral groove pitch of approximately 1,000 convolutions/inch and wherein said second surface regions have a spiral groove pitch of approximately 8,000 grooves/inch.

6. The combination according to claim 5 wherein said spiral groove is a V-shaped spiral groove having an included angle of 110°.

* * * * *